US011831498B1

(12) United States Patent
Janakiraman et al.

(10) Patent No.: US 11,831,498 B1
(45) Date of Patent: Nov. 28, 2023

(54) INTEGRATING AN EXISTING CLOUD NETWORK INTO A TARGET ENVIRONMENT

(71) Applicant: Cisco Technology, Inc., San Jose, CA (US)

(72) Inventors: Rajagopalan Janakiraman, Cupertino, CA (US); Sai Vemuri, Cupertino, CA (US); Sonia Gulrajani, Freemont, CA (US); Sree Balaji Varadharajan, Santa Clara, CA (US); Jose Carlos Recuero Arias, Petaluma, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/751,205

(22) Filed: May 23, 2022

(51) Int. Cl.
*G06F 9/455* (2018.01)
*H04L 41/0806* (2022.01)
*H04L 41/084* (2022.01)
*H04L 41/082* (2022.01)

(52) U.S. Cl.
CPC ........ *H04L 41/0806* (2013.01); *H04L 41/082* (2013.01); *H04L 41/0846* (2013.01)

(58) Field of Classification Search
CPC ............... H04L 41/0806; H04L 41/082; H04L 41/0846
See application file for complete search history.

(56) References Cited

U.S. PATENT DOCUMENTS

| | | | |
|---|---|---|---|
| 10,193,753 B1* | 1/2019 | Tabet | H04L 41/0843 |
| 11,134,013 B1 | 9/2021 | Allen et al. | |
| 2016/0050116 A1* | 2/2016 | Sheshadri | H04L 41/0853 709/221 |
| 2016/0337473 A1 | 11/2016 | Rao | |
| 2016/0378450 A1* | 12/2016 | Fu | H04L 67/34 717/177 |
| 2020/0050494 A1* | 2/2020 | Bartfai-Walcott | G06F 9/5083 |
| 2020/0067733 A1* | 2/2020 | Hira | H04L 12/4633 |
| 2020/0110638 A1* | 4/2020 | Asthana | H04L 67/51 |
| 2020/0356532 A1 | 11/2020 | Haggerty et al. | |
| 2021/0006467 A1 | 1/2021 | Aronov et al. | |
| 2021/0028993 A1 | 1/2021 | Kavadimatti et al. | |
| 2022/0131898 A1* | 4/2022 | Hooda | H04L 63/1433 |
| 2022/0197773 A1* | 6/2022 | Butler | G06F 9/5038 |

FOREIGN PATENT DOCUMENTS

EP     3496357 A1 *  6/2019

* cited by examiner

*Primary Examiner* — Christopher B Robinson
(74) *Attorney, Agent, or Firm* — Lee & Hayes, P.C.

(57) ABSTRACT

This disclosure describes techniques for integrating an existing cloud network into a new cloud network. The techniques may include inventorying network resources of an existing cloud network in a multi-cloud network environment. The techniques may also include creating logical resources to represent the network resources of the existing cloud network in a cloud-agnostic network configuration model. In some examples, a target cloud network may be provisioned using the cloud-agnostic network configuration model.

20 Claims, 7 Drawing Sheets

FIG. 1

```
200 ─▶ for each Subnet, s, in Node B {
      for each route, r, in Node A's RT, RTA {
            Can s be reached via r ?
                  1. Check NH for r
                  2. If NH is a TGW, check all the routes in the TGW
                        RT for reachability to s
                        2.a. Check the NH or the route
                        2.c. If NH is a TGW Peering attachment, then
                              start with the routes in the RT attached to the
                              TGW Peering attachment.
                        2.b. If NH is a VPC Attachment, the s is reachable
            if s can be reached {
                  move to next s
            } else {
                  move to next r
            }
      }
}

Are all subnets reachable? {
      Edge from Node A to Node B ◀── 202
} else {
      No Edge from Node A to Node B
}
```

| Src Node | Dst Nodes|
| ---      | ---      |
| A        | B, C, D  |
| B        | A, D     |
| C        | A, B     |
| D        | A, B     |
     ↑      \___ ___/
    302         304
                  304
```

FIG. 3

```
400 ─┐ for each src node {
    for each of the destination nodes {
        is there a nw edge from dst to src ?
        if no {
            these nodes cannot form a network
            break loop
        }
    } for each of the destination nodes {
        use it as a src node and check for nw edge to rest of the
        destination nodes
        is there a nw edge from this src to the dst node. This is
        similar to the previous loop
    } is there full mesh reachability?
    if yes {
        form a network resource with these nodes  ◄─ 402
        mark all the nodes as covered and work with the rest of the nodes
    }
}
```

INTEGRATING AN EXISTING CLOUD NETWORK INTO A TARGET ENVIRONMENT

TECHNICAL FIELD

The present disclosure relates generally to techniques for integrating an existing public cloud network into another network and/or connectivity model, thereby improving operations and connectivity within a multi-cloud network environment.

BACKGROUND

In network environments, greenfielding may refer to installation of new computer technology where none existed before. For example, an expanding business may open a new office, installing a variety of new computer network equipment. In this example, no legacy code is expected to exist on or among the new equipment. In contrast, brownfielding may refer to installation of new hardware or software components within an existing computer network. In this example, the new hardware or software may need to coexist and communicate with legacy information technology (IT) systems, components, and/or code, presenting integration challenges.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

DESCRIPTION OF EXAMPLE EMBODIMENTS

Overview

This disclosure describes, at least in part, a method that may be implemented by a multi-site orchestrator communicatively coupled to an existing cloud network and a target cloud network. The method may include inventorying, by the multi-site orchestrator, network resources of the existing cloud network in a multi-cloud network environment. The method may include generating one or more mappings of the network resources of the existing cloud network. The method may also include creating logical resources to represent the network resources of the existing cloud network in a cloud-agnostic network configuration model. In some examples, the one or more mappings of the network resources may be incorporated into the cloud-agnostic network configuration model. Based at least in part on the cloud-agnostic network configuration model, the method may further include provisioning a target cloud network in the multi-cloud network environment.

This disclosure describes, at least in part, a method that may be implemented by a multi-site orchestrator communicatively coupled to an existing cloud network and a target cloud network. The method may include inventorying instantiated network resources of an existing cloud network in a multi-cloud network environment. The method may also include creating logical resources to represent mappings of the instantiated network resources of the existing cloud network in a cloud-agnostic network configuration model. Further, the method may include provisioning a greenfield deployment of a target cloud network based at least in part on the cloud-agnostic network configuration model.

Additionally, the techniques described herein may be performed by a system and/or device having non-transitory computer-readable media storing computer-executable instructions that, when executed by one or more processors, performs the method described above.

EXAMPLE EMBODIMENTS

This disclosure describes techniques for integrating an existing cloud network into a new cloud network. For example, network information from an existing cloud network may be mapped into a cloud-agnostic network configuration model. The cloud-agnostic network configuration model may then be used to map and/or replicate the network information into a target cloud network (e.g., new cloud network, target environment). The process of mapping and replicating may be performed by a multi-site orchestrator, in some examples. Using the cloud-agnostic network configuration model, the multi-site orchestrator may be able to successfully replicate an existing cloud network into a target cloud network for improved network operations, even in instances of a relatively complex existing cloud network.

One of the current challenges with multi-cloud networking is brownfield of an existing cloud network into a target cloud network that features a higher layer (or otherwise mismatched) network and/or connectivity model. Integration may be further complicated in a situation where legacy code in the existing cloud network does not uniformly follow established network guidelines. However, integration of such a mismatched system may be important or even essential for efficient management and/or operation of a multi-cloud environment and/or multi-site computing network. Furthermore, successful integration may help to build rich visualization and network audit capabilities and compliance tools across multiple networks, from one public cloud to another.

In general, example use cases may help to envision the value of network integration concepts. A first example use case may be a cloud administration team wishing to integrate a cloud network with on-premise application centric infrastructure (ACI) data centers. The integration may be daunting to the cloud administration team, which may be concerned about interrupting current productivity/operations of the enterprise. However, the present network integration concepts may support brownfield import, which may be relevant to an object-oriented model or an application programming interface (API) to define a generic multi-cloud network model for the existing cloud network infrastructure. The object-oriented model generation can avoid a transition burden of the cloud resources, which are not disturbed in this use case. In a second example use case, existing infrastructure may be scaled to new regions and/or new accounts (brownfield or greenfield). A current cloud network may be saturated, for instance. However, reproducing a cloud deployment, and/or managing multiple regions and accounts, may be prohibitively resource and/or time intensive in the view of the administration team. The present network integration concepts can help, by importing the existing cloud deployment and deriving equivalent or at least similar object-oriented model policies. In a third example use case, existing infrastructure may be scaled to completely new sites and/or new cloud providers (greenfield). In any of these example use cases, an administration team may be tasked with moving operations from one cloud infrastructure (e.g., Amazon Web Services (AWS), Azure, Google Cloud Platform (GCP), Alibaba Cloud, Oracle Cloud, etc.) to a different cloud infrastructure (e.g., from AWS to Azure). The present network integration concepts may help to generalize the object-oriented model policy from the existing cloud infrastructure, add a level of abstraction by constructing a cloud-agnostic network configuration model, then deploy the resulting model (e.g., template) in to a second site with the target cloud infrastructure, or within the same site in the brownfield example. As a result, a functionally equivalent infrastructure may be deployed at the target site.

Some current solutions for network integration may only accomplish a partial brownfield of an existing virtual private cloud (VPC) network. Current solutions may not attempt brownfielding an entirety of the existing cloud network. For instance, portions of an existing cloud network that may not be addressed with current integration solutions may include cloud-native routing hub (e.g., transit gateway (TGW) in AWS, virtual wide area network (VWAN) hub in Azure) attachments, route tables, external connectivity sessions (e.g., internet protocol security (IPsec), Direct Connect) running on a cloud-native routing hub, etc. One reason some portions of an existing cloud network may not be addressed with current integration solutions is due to the complexity involved with attempting to migrate the network information successfully. As disclosed herein, the present techniques for network integration provide capabilities for a more complete, and therefore more successful, integration of an existing cloud network into a target cloud network.

Although the examples described herein may refer to a server device as performing network integration processes, the techniques can generally be applied to any device in a network. Further, the techniques are generally applicable for any network of devices managed by any entity where virtual resources are provisioned. In some instances, the techniques may be performed by software-defined networking (SDN), and in other examples, various devices may be used in a system to perform the techniques described herein. The devices by which the techniques are performed herein are a matter of implementation, and the techniques described are not limited to any specific architecture or implementation.

The techniques described herein provide various improvements and efficiencies with respect to network communications. For instance, the techniques described herein may reduce the amount of computational resource use, storage, dropped data, latency, and other issues experienced in networks due to lack of network resources, overuse of network resources, issues with timing of network communications, and/or improper routing of data. By improving network communications across a network, overall performance by servers and virtual resources may be improved.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
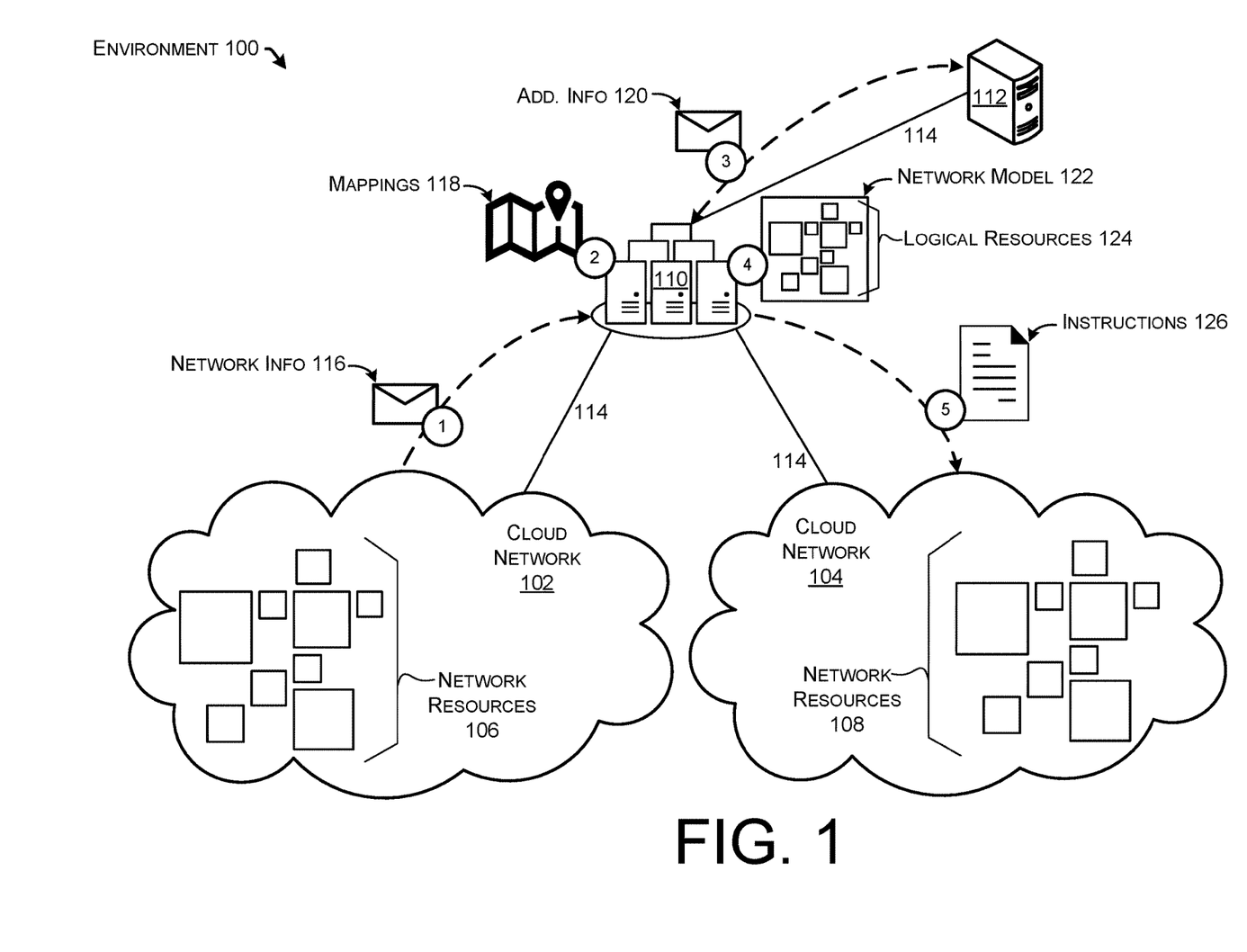
FIG. 1 illustrates a component diagram with an example environment in which network integration may be employed as part of communications between network devices, in accordance with the present concepts.

FIG. 1 illustrates an example environment 100 in accordance with the present network integration concepts. Example environment 100 may represent a multi-cloud environment, including at least cloud network 102 and cloud network 104. Furthermore, FIG. 1 may be viewed as illustrating an example network integration scenario, in which cloud network 102 may represent an "existing" cloud network that includes one or more network resources 106, while cloud network 104 may represent a "target" cloud network that includes one or more network resources 108. Example environment 100 may also include a multi-site orchestrator 110 (e.g., controller) and a computing device 112.

Within example environment 100, multi-site orchestrator 110 may exchange communications (e.g., packets) with computing devices of cloud network 102 and/or 104, such as with network resources 106 and/or 108, or with other devices, such as computing device 112, via a network connection(s) 114. For instance, the network connections 114 may be transport control protocol (TCP) network connections or any network connection (e.g., information-centric networking (ICN)) that enables the multi-site orchestrator 110, network resources 106, network resources 108, etc., to exchange packets with other computing devices. It should be appreciated that the term "network connection" may also be referred to as a "data path" and/or a "network path." Note the use of cloud networks in this example is not meant to be limiting. Other types of networks are contemplated in accordance with network integration concepts.

FIGS. 1A-1D show several examples of communications between multi-site orchestrator 110 and various other devices. The communications are indicated with dashed, numbered lines. For example, referring to FIG. 1A, at "Step 1," multi-site orchestrator 110 may receive network information 116 from cloud network 102. For instance, the network information 116 may be sent from a network resource 106 of cloud network 102. In some examples, network information 116 may include details of cloud network 102 that may be used to build a model of cloud network 102. For instance, network information 116 may include cloud-native data relevant to network resources 106 in cloud network 102, such as cloud-native routing hub attachments, route tables, external connectivity sessions running on a cloud-native routing hub, etc. As described in more detail below, Step 1 may represent a network inventory process.

At "Step 2," in some cases, multi-site orchestrator 110 may utilize network information 116 to generate one or more mappings 118 of the network resources 106 of cloud network 102. The mappings may in effect describe relationships between the network resources 106 of cloud network 102 and/or other elements, built from the details in network information 116. As such, Step 2 may represent a network discovery process, discovering the relationships among the network resources 106.

At "Step 3," multi-site orchestrator 110 may communicate with computing device 112 and/or another entity to collect additional information 120 that may be helpful toward network integration processes. In some examples, multi-site orchestrator 110 may receive additional parameters or constraints regarding conditions that are to be met at the target cloud network 104. For instance, additional information 120 may represent information related to a desired cloud network infrastructure of target cloud network 104 (e.g., information or instructions related specifically to a cloud service intended for the target cloud network, such as Azure, etc.). Additionally or alternatively, additional information 120 may include user input from a cloud administrator, such as instructions to replicate cloud network 102, instructions to trigger an inventory of cloud network 102, selections of options for building a new network model, and/or instructions to initiate the provisioning of the target cloud network 104. Step 3 may also represent storing of network information 116, mappings 118, and/or other data at computing device 112, for instance.

At "Step 4," multi-site orchestrator 110 may utilize network information 116, mappings 118, and/or additional information 120 to generate a network model 122 of cloud network 102. In some examples, network model 122 may be a cloud-agnostic network configuration model. Network model 122 may be composed of logical resources 124. For instance, logical resources 124 may be created by multi-site orchestrator 110 to represent aspects of network information 116, mappings 118, and/or additional information 120, for instance. In some examples, logical resources 124 may be a logical representation of the network resources 106 of cloud network 102. Examples of logical resources will be provided below. Note that network model 122 and/or logical resources 124 may also be stored in a database, such as at computing device 112, in some examples.

At "Step 5," multi-site orchestrator 110 may send instructions 126 to cloud network 104 in order to provision cloud network 104. For instance, cloud network 104 may be provisioned with network resources 108 based on network model 122. A result of provisioning cloud network 104 based on network model 122 may be replication and/or backup of cloud network 102 at the new, target cloud network 104. Therefore, guided by network model 122, cloud network 104 will be provisioned with network resources 108 with capabilities similar to network resources 106 of cloud network 102. Note that although FIG. 1 depicts target cloud network 104 as a separate site, in effect, target cloud network 104 may be the same site as existing cloud network 102, but reprovisioned with network model 122. For instance, in the first example use case described above, a cloud administration team may wish to integrate an existing cloud network with on-premise application centric infrastructure (ACI) data centers, for instance. The present network integration concepts may support brownfield import using network model 122, which can include generation of ACI policy for the existing cloud network infrastructure.

Steps 1-5 of FIG. 1, introduced above, provide a simple overview of example steps that may be involved in a network integration process. Additional detail regarding network integration concepts will be provided below, with reference to the example scenario depicted in FIG. 1.

In some examples, brownfield network discovery may be viewed as the process of deriving a network model from network resources 106 found through an inventory process. In FIG. 1, Step 1 may include an inventory process to discover the network resources 106 of cloud network 102. Information regarding the network resources 106 may be included in network information 116. Therefore, Step 2 may comprise a network discovery process, creating the mappings 118 of the network resources 106 found in cloud network 102. Stated another way, the mappings 118 may show how the network resources 106 of cloud network 102 are networked together.

In order to properly organize network information 116 into mappings 118, working definitions of the network resources 106 of cloud network 102 may be helpful. For example, a "network" may be described as a set of VPCs and/or subnets that are (potentially) fully interconnected, and may also share a same set of routes. Stated another way, each entity (VPC and/or subnet) of cloud network 102 would be able to reach the same set of destinations. If a set of VPCs/subnets has the same set of routes, then the set of VPCs/subnets may be connected to one or more route tables which have the same route reachability. Extending this idea, a route table in a VPC/VNET may become a "node" in the network. Network discovery then becomes the discovery of all such nodes and analyzing the interconnection between these nodes, as described in further detail below. Some example deployments of a network that may be inventoried include a VPC as its own network, a collection of VPCs as a network, a subset of the subnets in one VPC as a network, a collection of subnets from more than one VPC as a network, etc.

In some examples, an organization's network (e.g., cloud network 102) may span multiple accounts. When an account and account credentials are configured, an inventory process may include polling for all the network resources 106 in the accounts. An inventory process may be initiated by posting a command to inventory a network, such as "DiscoverNw resource" (via additional information 120, for instance). This mechanism of triggering inventory and/or network discovery is not meant to be limiting. Various other methods are contemplated for triggering inventory and/or network discovery processes. Some example network resources 106 from an inventory of cloud network 102 may include transit gateways (TGWs), TGW route tables, TGW associations (VPC), VPCs, subnets, VPC routing tables (RTs), etc.

An inventory process may be triggered at any time, and may run alongside normal cloud network operations. An inventory process may include several phases. Example phases of an inventory process may include reverse engineering endpoint groups (EPGs) and their classification(s), reverse engineering contracts and/or filters associated with SG table entries, running an algorithm to detect if there are valid routes between any two EPGs, determining contracts across cloud sites, etc.

In some implementations, to create network model 122 of cloud network 102, logical resources 124 may be created that represent network resources 106. The logical resources 124 may be created using the network information 116, mappings 118, additional information 120, and/or other information about cloud network 102. For instance, the logical resources 124 may be created by reading the state of the network resources 106 that were found through the inventory process. Example logical resources 124 may include nodes, edges, and network edges, which may be arranged into a network, as listed and described below.

Node. A node may consist of a VPC routing table (RT). A node may also consist of a list of classless interdomain routings (CIDRs), which may be associated with the RT, especially if the RT is a main RT. The node may also consist of a list of subnet internet protocol (IP) addresses associated with the RT if there are any explicit subnet associations. Further, a node may consist of a list of TGW attachments. In some examples, each "AwsRouteTableOper" resource may translate to one node.

Edge. An edge may represent reachability between two nodes. An edge may be unidirectional. For instance, if an example Node A is able to reach a Node B, then an edge exists from Node A to Node B. Edges may be calculated by determining the reachability across pairs of nodes. For example, an example pair of nodes (Node A/Node B pair) may be denoted as:

Node A: RT-A, CIDR-A1, CIDR-A2
Node B: RT-B, Subnet-B1, Subnet-B2

The example Node A/Node B pair may be attached to a same TGW, or may be attached across regions. For Node B to be reachable from Node A, both Subnet-B1 and Subnet-B2 should be reachable. Similarly, for Node A to be reachable from Node B, both CIDR-A1 and CIDR-A2 should be reachable.

Figure 2:
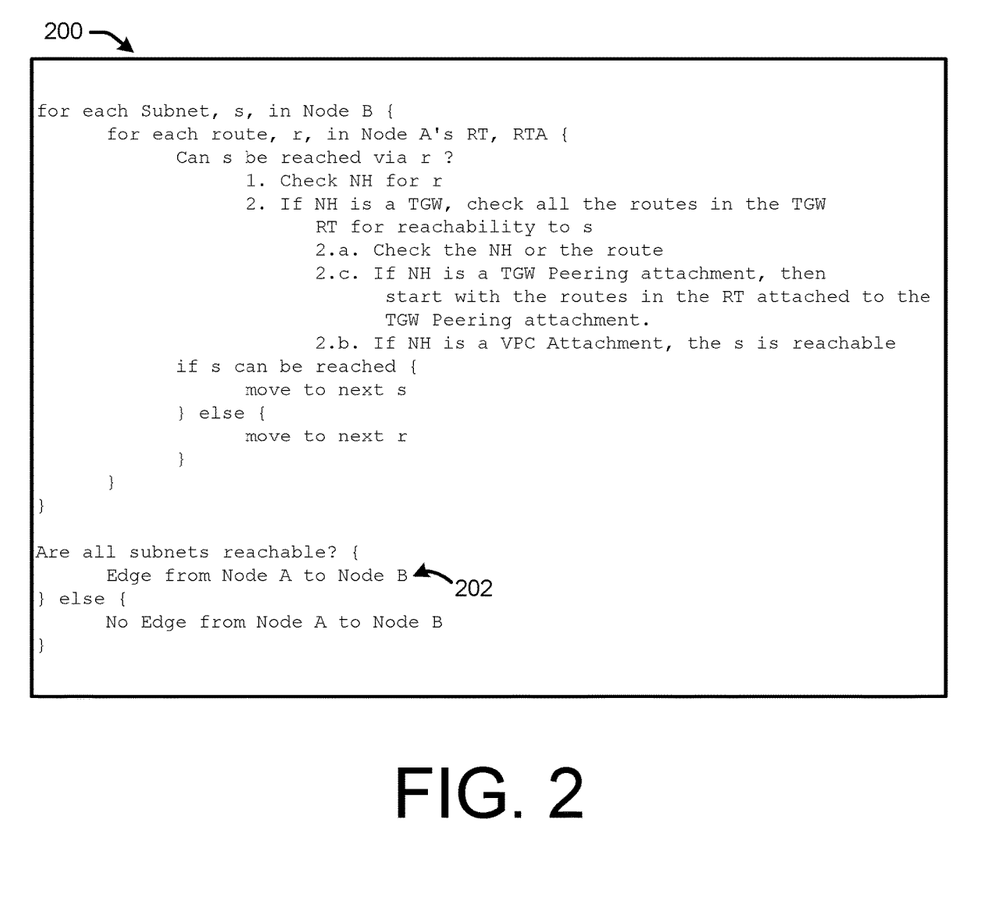
FIGS. 2 and 4 illustrate example of computer code that may be used to implement network integration concepts among network devices, in accordance with the present concepts.

FIG. 2 illustrates example code 200 that may be used to determine reachability from example Node A to example Node B. For instance, at line 202, the program may determine that an edge exists from Node A to Node B, based on all subnets of Node B being reachable from Node A. In some examples, a list of (potentially) all edges calculated from Node A to other nodes may be maintained as a map of edges, which may be included in mappings 118.

Network Edge. A network edge may be viewed as a type of edge in which, along with reachability from Node A to Node B, a set of reachable destinations from Node A and Node B are the same. Stated another way, a network edge may be a type of an edge in which routing tables for both nodes of the edge have the same set of routes. In accordance with the present network integration concepts, some adjustments may be made while comparing the route tables. Following are several example adjustments that may be made, in some examples. For instance an adjustment may comprise ignoring local routes. Internet routes may have the same prefix, but some internet gateway IDs (e.g., NH IGW IDs) may be ignored since the IDs may be different for each VPC. However, the IDs may be of the same type (i.e., IGW). Routes to the CIDRs of the destination node may be ignored. Node A may have a route for a subnet-B1 of Node B; however, the same subnet-B1 may be a local route in a routing table of Node B. With adjustments, such as the preceding examples, in place, a comparison may be performed on the two routing tables that are represented as maps. The list of (potentially) all network edges from node A to other nodes may be maintained as a map of network edges, which may be included in mappings 118. Note: the map of network edges may be different from the map of edges described above.

Network. A network is a collection of nodes with (potentially) fully meshed network edges. Note that in some examples, only nodes included in the list of network edges may be able to form networks. Stated another way, networks may be formed by picking the nodes in the "network edge" list that have edges between all of the nodes. In some examples, a network may represent a cloud-agnostic network configuration model and/or network model 122.

Figure 3:
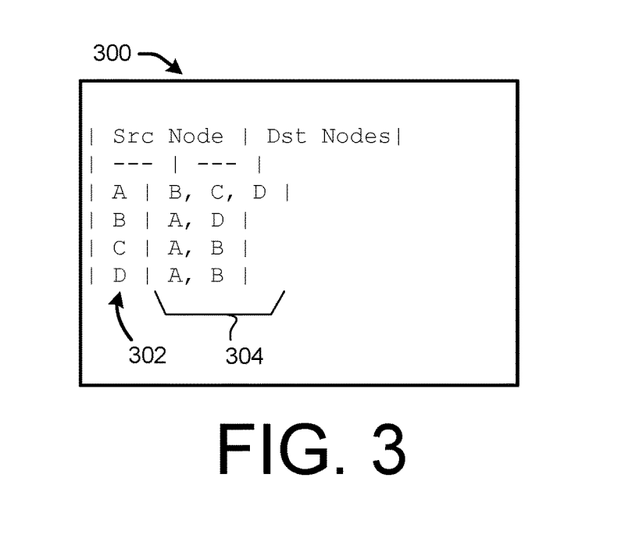
FIG. 3 illustrates an example set 300 of network edge nodes that may be used in conjunction with the examples of computer code shown in FIGS. 2 and 4 to implement network integration concepts among network devices, in accordance with the present concepts.

FIG. 3 illustrates an example set 300 of network edge nodes arranged in a matrix. In the example set 300, column 302 lists Nodes A, B, C, and D as "source" nodes. Column 304 lists various "destination" nodes for each source node. For instance, source Node B is related to destination Nodes A and D. In the example depicted in the matrix, Node A is able to reach Nodes B, C, and D, but Node C does not have reachability to Node D. However, Nodes A, B, and D have reachability amongst each other. In this example, a network of Nodes A, B, and D would be possible.

Figure 4:
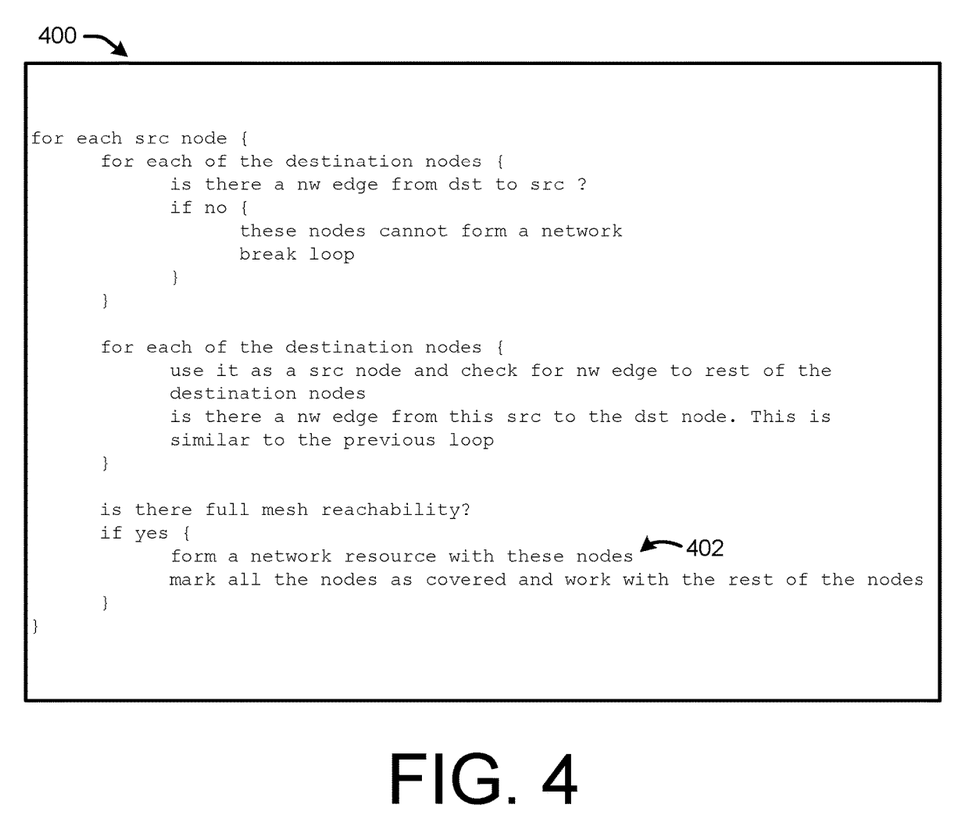

FIG. 4 illustrates example code 400 for determining a network. For instance, the determination may be applied to a set of nodes such as the example provided in FIG. 3. As shown at line 402 of FIG. 4, a network is formed if full mesh reachability is found among the nodes.

After importing cloud network 102 into a cloud agnostic network model (e.g., network model 122), the network environment of the existing cloud network 102 may be recreated in the target cloud network 104 (Step 5 of FIG. 1). The following description presents an example scenario for instantiation of the target cloud network 104, using network model 122. A user, such as a cloud administrator, may interact with a user interface (UI) to provide user input to the network integration process. For instance, the user may interface via computing device 112, and thereby provide user input such as additional information 120.

In some examples, an account/account credentials related to the user may be configured. The user may then be presented with an inventory of resources (e.g., logical resources 124) in the UI, such as VPCs/Subnets/Hub instances, TGW for AWS, VWAN for Azure, etc. The user may select (click on) any of the VPCs/Subnets to be configured as a network. Selection may internally create a network resource with a selector that is based on a list of resource provider IDs, for instance.

Optionally, a hub may be configured. (If no hub configuration is done in the UI, a default may be to use a hub provisioned in a cloud provider account.) The user may be presented with a list of the hub instances (e.g., TGW for AWS, VWAN for Azure). If only one instance of a hub available, the hub may be automatically selected by the UI. If there are multiple hub instances present, the user may select one instance for each hub. Multiple hubs instances may result in a resource such as "HubNetwork" being created with the hub instance information. This two-step configuration may result in the deployment of the network. In both greenfield and brownfield cases, a configuration that uses system defaults requires relatively minimal input. Low overhead requirement may align with a goal of the cloud fabric as a service offering.

In some examples, VPCs and/or subnets may be configured through selectors. Separate selectors may exist for VPCs and subnets. Subnets and VPCs may be selected using the following options:

Provider ID. A list of one or more provider IDs (e.g., VPC IDs for VPCs and subnet IDs for subnets) may be specified for a selector match. Provider ID may represent a static method of choosing the VPCs/subnets.

Tags. A list of tags, such as tags in the cloud VPC resource for VPCs and tags in the cloud subnet resource for subnets, may be used to select subnets/VPCs.

VPC and/or Subnet Priority. In some examples, situations may arise in which selectors are configured such that a same VPC/subnet is included in two different networks, or a VPC belongs to one network while one or more subnets in that VPC belong to another network(s). For VPC/subnets selected in multiple networks, a fault may be raised on the second network in which the VPC appears. (This typically will be blocked when configuring the network via the UI as the UI will not display VPCs/subnets as options if they are already a part of another network. For a VPC in network and a subnet of the VPC in another network, the subnets may take priority over VPCs. The specific subnet may be a part of the second network and all other subnets of the VPC may belong to the first network.

Various additional hub configurations are contemplated. For instance, as an optional configuration, every network may be associated with one or more hub networks. In some examples, a network may only talk to all other networks connected to the same hub based upon inter-network policies. Any given hub network may be isolated from other hub networks in terms of network traffic. For example, in an instance where one hub network exists for all production networks and a second hub network exists for all non-production networks, the first and second networks may not talk to one another. One network may be associated with more than one hub for scenarios such as shared services. The shared services network may be connected to one hub, while the network may be connected to another hub for its connectivity to other networks, while still making use of the shared services. When a network is associated with a first and second hub, the network may talk with potentially all networks of both hubs based on the inter-network policy. When a network attaches to more than one hub, each VPC in the network attaches to all the hubs associated with the network. If the user does not explicitly associate the network with a policy, a default hub policy may be associated with the network.

To summarize, network integration concepts may help to generalize a network configuration from an existing cloud infrastructure. The concepts may help add a level of abstraction of the network configuration by constructing a cloud-agnostic network configuration model. The concepts may also include deploying the resulting model into a target cloud network. In some examples, the target cloud network may be a brownfield deployment of the model within the same existing cloud site. In other examples, the target cloud network may be a greenfield deployment of the model at a new cloud site. As a result, a functionally equivalent infrastructure may be deployed in the target cloud network. The result may help any customer with an existing public cloud deployment for adopting an improved cloud infrastructure (e.g., ACI) to control their environment, and also as a cloud operations monitoring solution.

Figure 5:
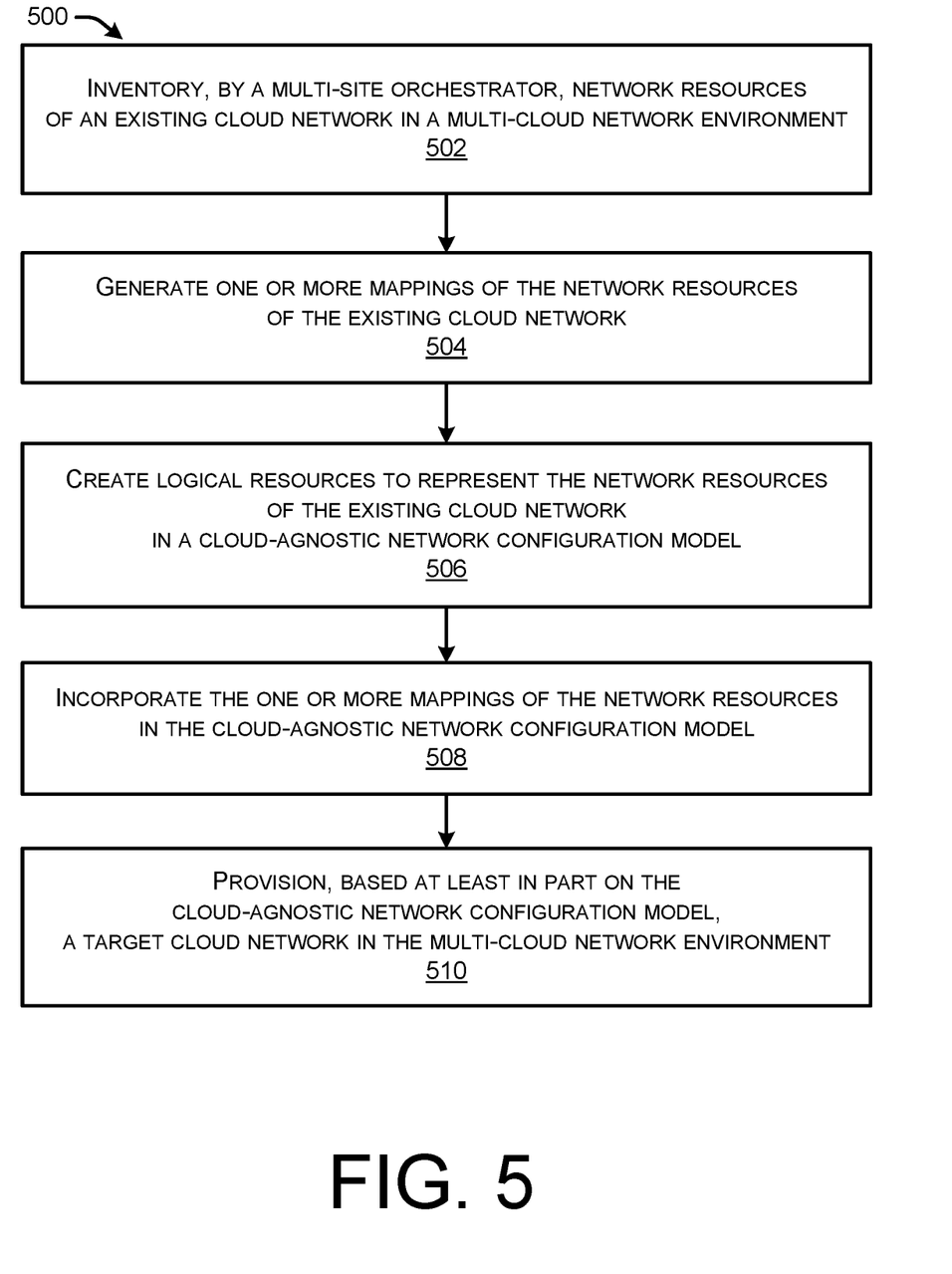
FIGS. 5 and 6 illustrate flow diagrams of example methods for network integration processes among network devices, in accordance with the present concepts.
Figure 6:
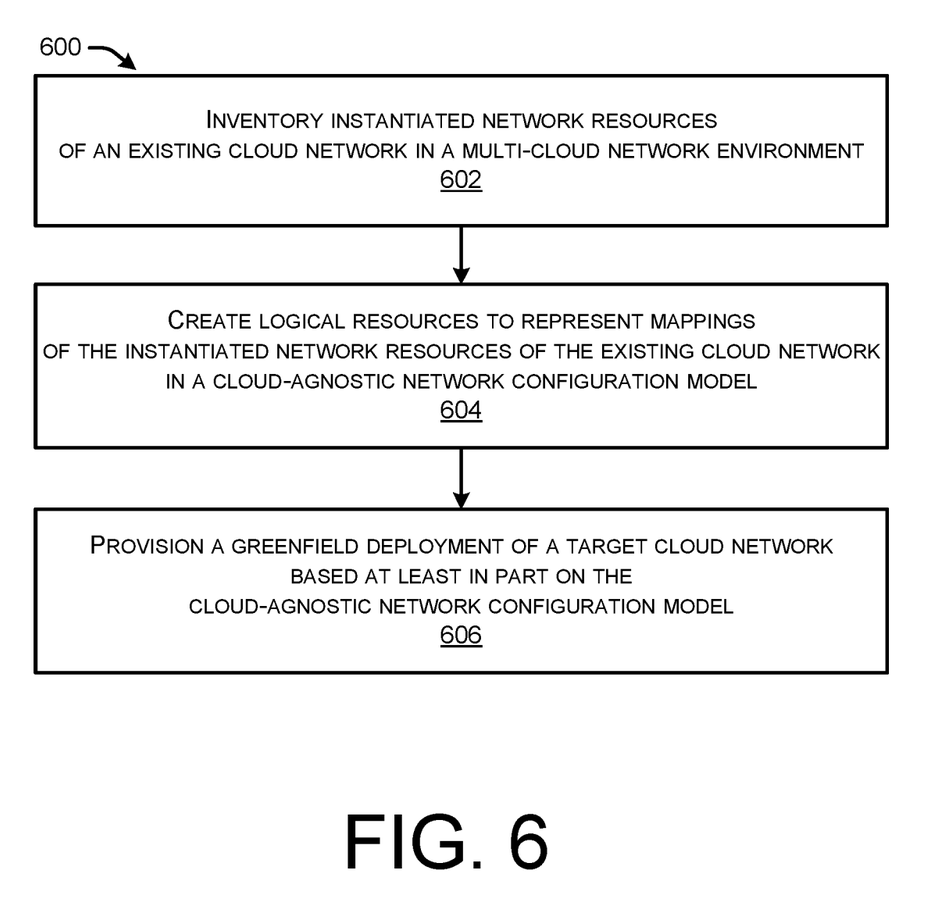

FIGS. 5 and 6 illustrate flow diagrams of example methods 500 and 600 that include functions that may be performed at least partly by a computing device, such as multi-site orchestrator 110 described relative to FIG. 1. The logical operations described herein with respect to FIGS. 5 and 6 may be implemented (1) as a sequence of computer-implemented acts or program modules running on a computing system and/or (2) as interconnected machine logic circuits or circuit modules within the computing system.

The implementation of the various devices and/or components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations might be performed than shown in the FIGS. 5 and 6 and described herein. These operations may also be performed in parallel, or in a different order than those described herein. Some or all of these operations may also be performed by components other than those specifically identified. Although the techniques described in this disclosure is with reference to specific devices, in other examples, the techniques may be implemented by less devices, more devices, different devices, or any configuration of devices and/or components.

FIG. 5 illustrates a flow diagram of an example method 500 for network devices to perform loop prevention techniques. Method 500 may be performed by a computing device (e.g., multi-site orchestrator 110) communicatively coupled to one or more cloud networks (e.g., cloud network 102 and/or 104), for instance. In some examples, method 500 may be performed by a computing device comprising one or more processors and one or more non-transitory computer-readable media storing computer-executable instructions that, when executed by the one or more processors, cause the one or more processors to perform method 500.

At 502, method 500 may include inventorying, by a multi-site orchestrator, network resources of an existing cloud network in a multi-cloud network environment. In some examples, the network resources may comprise instantiated resources at the existing cloud network. Some examples of types of network resources that may be examined through an inventory process include transit gateways (TGWs), TGW route tables, virtual private clouds (VPCs), subnets, and VPC routing tables (RT). Additional examples of network resources that may be examined through an inventory process include cloud-native routing hub attachments (e.g., transit gateway (TGW) in AWS, virtual wide area network (VWAN) hub in Azure), external connectivity sessions (e.g., internet protocol security (IPsec), Direct Connect) running on a cloud-native routing hub, etc.

At 504, method 500 may include generating one or more mappings of the network resources of the existing cloud network. Mappings may include at least one edge map of a subset of the edges from an individual node to other nodes. Mappings may also include a network edge map of at least one network edge. In some examples, method 500 may further include performing a network discovery process on the instantiated network resources of the existing cloud network to generate the mappings.

At 506, method 500 may include creating logical resources to represent the network resources of the existing cloud network in a cloud-agnostic network configuration model. In some examples, the logical resources may include nodes, edges, and/or network edges. Working definitions of these elements have been provided above. These examples are not meant to be limiting, other example ares contemplated for serving as abstractions of the instantiated elements of an existing cloud network, and/or of elements desired in a deployment of a target cloud network.

At 508, method 500 may include incorporating the one or more mappings of the network resources in the cloud-agnostic network configuration model. Stated another way, the cloud-agnostic network configuration model may be built of the logical resources using the mappings as a guide for connecting resources.

At 510, method 500 may include provisioning a target cloud network in the multi-cloud network environment. The provisioning may be based at least in part on the cloud-agnostic network configuration model, for instance. In some examples, provisioning the target cloud network may comprise a brownfield process. For instance, the provisioning may be replacing a cloud configuration model of the existing cloud network using the cloud-agnostic network configuration model. In this instance, the target cloud network may be at the same site as the existing cloud network. Therefore, the provisioning is moving the network to a new network configuration, such as from AWS to Azure. In other examples, the provisioning the target cloud network may comprise a greenfield replication of the cloud-agnostic network configuration model. For instance, the target cloud network may be located at a different site than the existing cloud network, or the enterprise may need to expand resources by provisioning a new cloud network.

In some examples, method 500 may further include causing an inventory of the logical resources to be presented to a user. For instance, the user may be a network administrator tasked with assisting in the provisioning of a target cloud network. Method 500 may include receiving an indication of a selection by the user of at least one of the logical resources. For instance, the user may be presented with options through a user interface, and may be able to select logical resource that aligns with a desired feature of the target cloud network, to correlate with the intended purpose of the target cloud network. Based at least in part on the indication of the selection by the user, method 500 may further include incorporating the logical resource into the cloud-agnostic network configuration model. In this manner, the desired feature will become part of the cloud-agnostic network configuration model and be provisioned in the target cloud network.

FIG. 6 illustrates a flow diagram of an example method 600 for network devices to perform loop prevention techniques. Method 600 may be performed by a computing device (e.g., multi-site orchestrator 110) communicatively coupled to one or more cloud networks (e.g., cloud network 102 and/or 104), for instance. In some examples, method 600 may be performed by a computing device comprising one or more processors and one or more non-transitory computer-readable media storing computer-executable instructions that, when executed by the one or more processors, cause the one or more processors to perform method 600.

At 602, method 600 may include inventorying instantiated network resources of an existing cloud network in a multi-cloud network environment. In some examples, inventorying of the instantiated network resources of the existing cloud network may be performed while the existing cloud network is continuing to service clients. As such, there may be no interruption to ongoing services provided by the existing cloud network while the inventory process is being performed. Furthermore, the inventorying may be repeated to ensure network information regarding the cloud network is updated.

At 604, method 600 may include creating logical resources to represent mappings of the instantiated network resources of the existing cloud network in a cloud-agnostic network configuration model. Method 600 may also include performing a network discovery process on the instantiated network resources of the existing cloud network to generate the mappings.

At 606, method 600 may include provisioning a greenfield deployment of a target cloud network based at least in part on the cloud-agnostic network configuration model. In some examples, the target cloud network may feature a different network configuration model than the existing cloud network. For instance, the existing cloud network may be configured to use AWS, while the target cloud network may be configured to use Azure. The cloud-agnostic network configuration model may therefore be an abstracted version of the network configuration of the existing cloud network, which is used to implement the capabilities of the existing cloud network into a new network configuration in the target cloud network.

Figure 7:
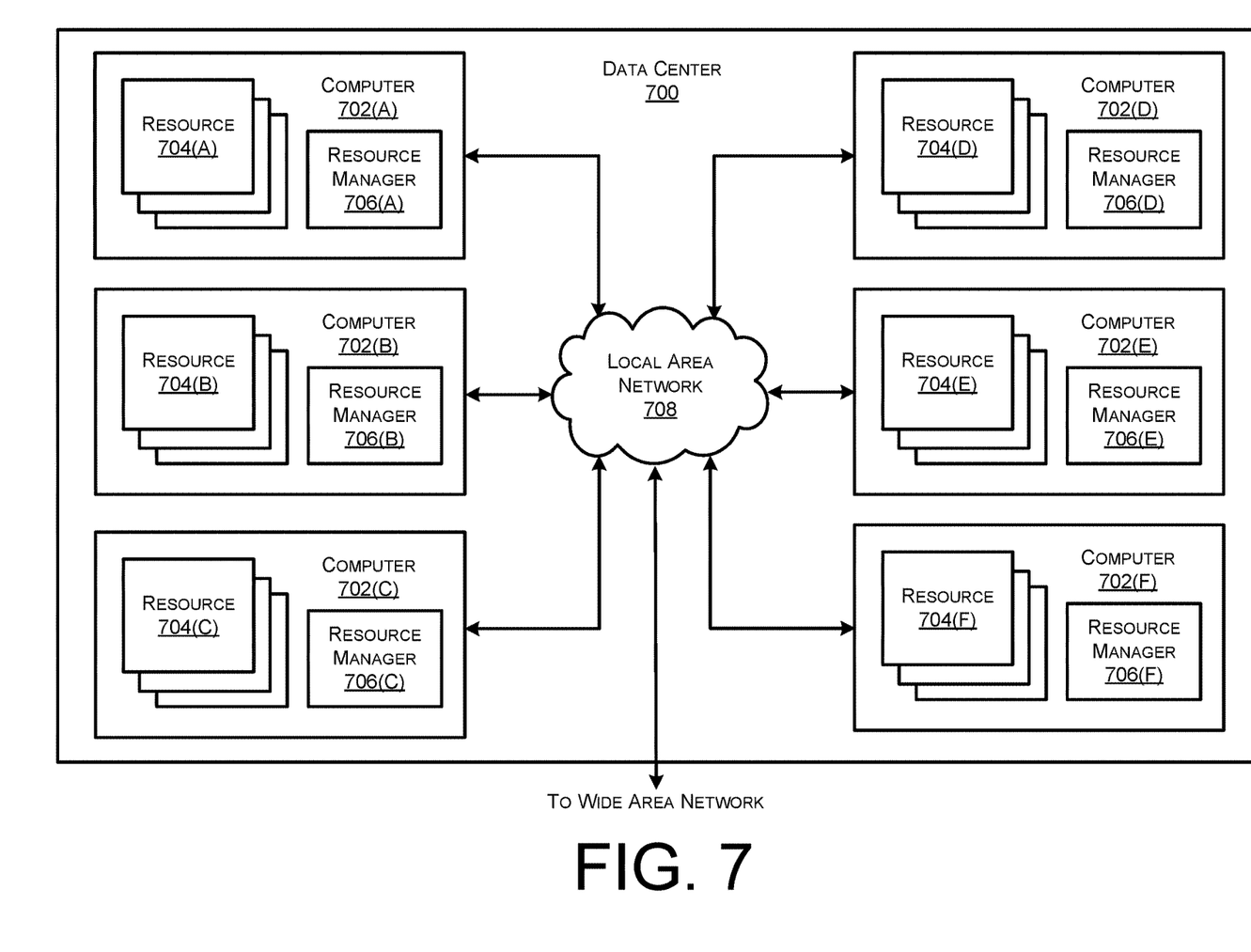
FIG. 7 illustrates a computing system diagram illustrating a configuration for a data center that can be utilized to implement aspects of the technologies disclosed herein.

FIG. 7 is a computing system diagram illustrating a configuration for a data center 700 that can be utilized to implement aspects of the technologies disclosed herein. The example data center 700 shown in FIG. 7 includes several computers 702A-702F (which might be referred to herein singularly as "a computer 702" or in the plural as "the computers 702") for providing computing resources. In some examples, the resources and/or computers 702 may include, or correspond to, any type of networked device described herein, such as multi-site orchestrator 110 and/or computing device 112). Although, computers 702 may comprise any type of networked device, such as servers, switches, routers, hubs, bridges, gateways, modems, repeaters, access points, hosts, etc.

The computers 702 can be standard tower, rack-mount, or blade server computers configured appropriately for providing computing resources. In some examples, the computers 702 may provide computing resources 704 including data processing resources such as virtual machine (VM) instances or hardware computing systems, database clusters, computing clusters, storage clusters, data storage resources, database resources, networking resources, and others. Some of the computers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single computer 702. Computers 702 in the data center 700 can also be configured to provide network services and other types of services.

In the example data center 700 shown in FIG. 7, an appropriate local area network (LAN) 708 is also utilized to interconnect the computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 700, between each of the computers 702A-702F in each data center 700, and, potentially, between computing resources in each of the computers 702. It should be appreciated that the configuration of the data center 700 described with reference to FIG. 7 is merely illustrative and that other implementations can be utilized.

In some examples, the computers 702 may each execute one or more application containers and/or virtual machines to perform techniques described herein. For instance, the containers and/or virtual machines may serve as server devices, user devices, and/or routers in the networks 102, 104, or 708.

In some instances, the data center 700 may provide computing resources, like application containers, VM instances, and storage, on a permanent or an as-needed basis. Among other types of functionality, the computing resources provided by a cloud computing network may be utilized to implement the various services and techniques described above. The computing resources 704 provided by the cloud computing network can include various types of computing resources, such as data processing resources like application containers and VM instances, data storage resources, networking resources, data communication resources, network services, and the like.

Each type of computing resource 704 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 704 not mentioned specifically herein.

The computing resources 704 provided by a cloud computing network may be enabled in one embodiment by one or more data centers 700 (which might be referred to herein singularly as "a data center 700" or in the plural as "the data centers 700"). The data centers 700 are facilities utilized to house and operate computer systems and associated components. The data centers 700 typically include redundant and backup power, communications, cooling, and security systems. The data centers 700 can also be located in geographically disparate locations. One illustrative embodiment for a data center 700 that can be utilized to implement the technologies disclosed herein will be described below with regards to FIG. 8.

Figure 8:
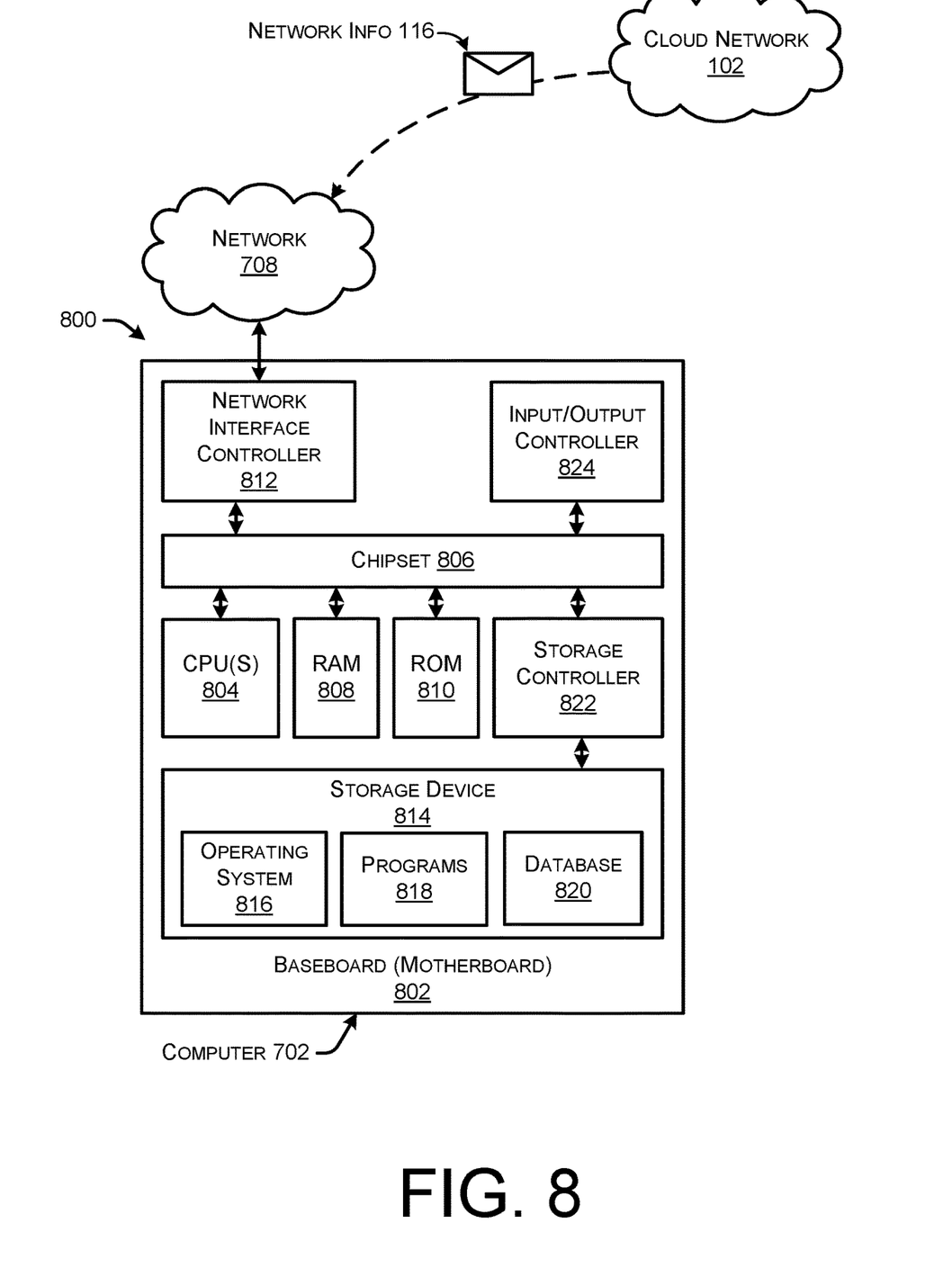
FIG. 8 is a computer architecture diagram showing an illustrative computer hardware architecture for implementing a device that can be utilized to implement aspects of the various technologies presented herein.

FIG. 8 shows an example computer architecture 800 for a computer 702 capable of executing program components for implementing the functionality described above. The computer architecture 800 shown in FIG. 8 illustrates a conventional server computer, workstation, desktop computer, laptop, tablet, network appliance, e-reader, smartphone, and/or other computing device, and can be utilized to execute any of the software components presented herein. The computer 702 may, in some examples, correspond to a physical device described herein (e.g., multi-site orchestrator 110, computing device 112), and may comprise networked devices such as servers, switches, routers, hubs, bridges, gateways, modems, repeaters, access points, etc. For instance, computer 702 may correspond to multi-site orchestrator 110.

As shown in FIG. 8, the computer 702 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 702.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 706 can provide an interface to a RAM 808, used as the main memory in the computer 702. The chipset 806 can further provide an interface to a computer-readable storage medium such as a read-only memory ("ROM") 810 or non-volatile RAM ("NVRAM") for storing basic routines that help to startup the computer 702 and to transfer information between the various components and devices. The ROM 810 or NVRAM can also store other software components necessary for the operation of the computer 702 in accordance with the configurations described herein.

The computer 702 can operate in a networked environment using logical connections to remote computing devices and computer systems through a network, such as the networks 102, 104, and/or 708. The chipset 806 can include functionality for providing network connectivity through a network interface controller (NIC) 812, such as a gigabit Ethernet adapter. The NIC 812 is capable of connecting the computer 702 to other computing devices over the network 708. For instance, in the example shown in FIG. 8, NIC 812 may help facilitate transfer of data, packets, and/or communications, such as network information 116, over the network 708 with cloud network 102. It should be appreciated that multiple NICs 812 can be present in the computer 702, connecting the computer to other types of networks and remote computer systems.

The computer 702 can be connected to a storage device 814 that provides non-volatile storage for the computer. The storage device 814 can store an operating system 816, programs 818, database 820, and/or other data. The storage device 814 can be connected to the computer 702 through a storage controller 822 connected to the chipset 806, for example. The storage device 814 can consist of one or more physical storage units. The storage controller 822 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 702 can store data on the storage device 814 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 814 is characterized as primary or secondary storage, and the like.

For example, the computer 702 can store information to the storage device 814 by issuing instructions through the storage controller 822 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 702 can further read information from the storage device 814 by detecting the physical states or characteristics of one or more particular locations within the physical storage units.

In addition to the mass storage device 814 described above, the computer 702 can have access to other computer-readable storage media to store and retrieve information, such as policies, program modules, data structures, and/or other data. It should be appreciated by those skilled in the art that computer-readable storage media is any available media that provides for the non-transitory storage of data and that can be accessed by the computer 702. In some examples, the operations performed by the network 708, and or any components included therein, may be supported by one or more devices similar to computer 702. Stated otherwise, some or all of the operations performed by the network 708, and or any components included therein, may be performed by one or more computer devices 702 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, ternary content addressable memory (TCAM), and/or other optical storage, magnetic cassettes, magnetic tape, magnetic disk storage or other magnetic storage devices, or any other medium that can be used to store the desired information in a non-transitory fashion.

As mentioned briefly above, the storage device 814 can store an operating system 816 utilized to control the operation of the computer 702. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 814 can store other system or application programs and data utilized by the computer 702.

In one embodiment, the storage device 814 or other computer-readable storage media is encoded with computer-executable instructions which, when loaded into the computer 702, transform the computer from a general-purpose computing system into a special-purpose computer capable of implementing the embodiments described herein. These computer-executable instructions transform the computer 702 by specifying how the CPUs 804 transition between states, as described above. According to one embodiment, the computer 702 has access to computer-readable storage media storing computer-executable instructions which, when executed by the computer 702, perform the various processes described above with regards to FIGS. 1-6. The computer 702 can also include computer-readable storage media having instructions stored thereupon for performing any of the other computer-implemented operations described herein.

The computer 702 can also include one or more input/output controllers 824 for receiving and processing input from a number of input devices, such as a keyboard, a mouse, a touchpad, a touch screen, an electronic stylus, or other type of input device. Similarly, an input/output controller 824 can provide output to a display, such as a computer monitor, a flat-panel display, a digital projector, a printer, or other type of output device. It will be appreciated that the computer 702 might not include all of the components shown in FIG. 8, can include other components that are not explicitly shown in FIG. 8, or might utilize an architecture completely different than that shown in FIG. 8.

As described herein, the computer 702 may comprise one or more devices, such as multi-site orchestrator 110 and/or computing device 112, computing devices within cloud network 102 and/or 104, and/or other devices. The computer 702 may include one or more hardware processors 804 (processors) configured to execute one or more stored instructions. The processor(s) 804 may comprise one or more cores. Further, the computer 702 may include one or more network interfaces configured to provide communications between the computer 702 and other devices, such as the communications described herein as being performed by multi-site orchestrator 110 and/or computing device 112, and/or other devices. In some examples, the communications may include data, packet, and/or other information transfer, for instance. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 818 may comprise any type of programs or processes to perform the techniques described in this disclosure in accordance with network integration techniques. For instance, the programs 818 may cause the computer 702 to perform techniques for communicating with other devices using any type of protocol or standard usable for determining connectivity. Additionally, the programs 818 may comprise instructions that cause the computer 702 to perform the specific techniques for network integration.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A computer-implemented method comprising:
   inventorying, by a multi-site orchestrator, instantiated network resources of an infrastructure of an existing cloud network in a multi-cloud network environment;
   determining one or more mappings that indicate relationships between the instantiated network resources within the infrastructure of the existing cloud network, at least some of the instantiated network resources being unique to the existing cloud network;
   determining logical resources that are generic representations of the instantiated network resources of the existing cloud network;
   generating, using the one or more mappings of the instantiated network resources and the logical resources, a cloud-agnostic network configuration model that comprises a cloud-agnostic representation of the infrastructure of the existing cloud network; and
   replicating the infrastructure of the existing cloud network into a target cloud network in the multi-cloud network environment by provisioning the target cloud network based at least in part on the cloud-agnostic network configuration model.

2. The computer-implemented method of claim 1, wherein the provisioning the target cloud network comprises a brownfield process for replacing a cloud configuration model of the target cloud network using the cloud-agnostic network configuration model.

3. The computer-implemented method of claim 1, wherein the provisioning the target cloud network comprises a greenfield replication of the cloud-agnostic network configuration model, wherein the target cloud network is located at a different site than the existing cloud network.

4. The computer-implemented method of claim 1, wherein the instantiated network resources comprise one or more of a transit gateway (TGW), a TGW route table, a virtual private cloud (VPC), a subnet, and a VPC routing table (RT).

5. The computer-implemented method of claim 1, wherein the logical resources comprise nodes, edges, and network edges.

6. The computer-implemented method of claim 5, wherein the one or more mappings include at least one edge map of a subset of the edges from an individual node to other nodes.

7. The computer-implemented method of claim 5, wherein the one or more mappings include a network edge map of at least one network edge, wherein routing tables for both nodes of the at least one network edge have a same set of routes.

8. The computer-implemented method of claim 1, further comprising:
   causing an inventory of the logical resources to be presented to a user;
   receiving an indication of a selection by the user of at least one of the logical resources; and
   based at least in part on the indication of the selection, incorporating the at least one of the logical resources into the cloud-agnostic network configuration model.

9. A server device comprising:
   one or more processors; and
   one or more non-transitory computer-readable media storing computer-executable instructions that, when executed by the one or more processors, cause the one or more processors to:
   inventory, by a multi-site orchestrator, instantiated network resources of an infrastructure of an existing cloud network in a multi-cloud network environment;
   determine one or more mappings that indicate relationships between the instantiated network resources within the infrastructure of the existing cloud network, at least some of the instantiated network resources being unique to the existing cloud network;
   determine logical resources that are generic representations of the instantiated network resources of the existing cloud network;
   generating, using the one or more mappings of the instantiated network resources and the logical resources, a cloud-agnostic network configuration model that comprises a cloud-agnostic representation of the infrastructure of the existing cloud network; and
   replicating the infrastructure of the existing cloud network into a target cloud network in the multi-cloud network environment by provisioning the target cloud network based at least in part on the cloud-agnostic network configuration model.

10. The server device of claim 9, wherein provisioning the target cloud network comprises a brownfield process for replacing a cloud configuration model of the target cloud network using the cloud-agnostic network configuration model.

11. The server device of claim 9, wherein provisioning the target cloud network comprises a greenfield replication of the cloud-agnostic network configuration model, wherein the target cloud network is located at a different site than the existing cloud network.

12. The server device of claim 9, wherein the instantiated network resources comprise one or more of a transit gateway (TGW), a TGW route table, a virtual private cloud (VPC), a subnet, and a VPC routing table (RT).

13. The server device of claim 9, wherein the logical resources comprise nodes, edges, and network edges.

14. The server device of claim 13, wherein the one or more mappings include at least one edge map of a subset of the edges from an individual node to other nodes.

15. The server device of claim 13, wherein the one or more mappings include a network edge map of at least one network edge, wherein routing tables for both nodes of the at least one network edge have a same set of routes.

16. The server device of claim 9, wherein the computer-executable instructions further cause the one or more processors to:
   cause an inventory of the logical resources to be presented to a user;
   receive an indication of a selection by the user of at least one of the logical resources; and
   based at least in part on the indication of the selection, incorporate the at least one of the logical resources into the cloud-agnostic network configuration model.

17. A method comprising:
   inventorying instantiated network resources of an existing cloud network in a multi-cloud network environment;
   determining logical resources that are generic representations of the instantiated network resources;
   generating a cloud-agnostic network configuration model that represents mappings of an infrastructure of the logical resources; and
   replicating the existing cloud network by provisioning a greenfield deployment of a target cloud network based at least in part on the cloud-agnostic network configuration model.

18. The method of claim 17, further comprising:
   performing a network discovery process on the instantiated network resources of the existing cloud network to generate the mappings of the infrastructure.

19. The method of claim 17, wherein the target cloud network features a different network configuration model than the existing cloud network.

20. The method of claim 17, wherein the inventorying the instantiated network resources of the existing cloud network is performed while the existing cloud network is continuing to service clients.

* * * * *